(12) United States Patent
Kannari et al.

(10) Patent No.: US 9,425,947 B2
(45) Date of Patent: Aug. 23, 2016

(54) WIRELESS DEVICE

(71) Applicant: FUJITSU LIMITED, Kawasaki-shi, Kanagawa (JP)

(72) Inventors: Hideyuki Kannari, Yokohama (JP); Masanori Hara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 13/852,583

(22) Filed: Mar. 28, 2013

(65) Prior Publication Data

US 2013/0258915 A1 Oct. 3, 2013

(30) Foreign Application Priority Data

Mar. 30, 2012 (JP) .................. 2012-083172

(51) Int. Cl.
| | | |
|---|---|---|
| *H04L 5/14* | (2006.01) | |
| *H04L 5/06* | (2006.01) | |
| *H04B 1/00* | (2006.01) | |

(52) U.S. Cl.
CPC .............. *H04L 5/143* (2013.01); *H04B 1/0057* (2013.01); *H04L 5/06* (2013.01)

(58) Field of Classification Search
USPC ........................................................ 370/281
See application file for complete search history.

(56) References Cited

U.S. PATENT DOCUMENTS

| | | | |
|---|---|---|---|
| 4,211,894 A | 7/1980 | Watanabe et al. | |
| 5,790,527 A * | 8/1998 | Janky et al. .................. | 370/330 |
| 6,028,850 A * | 2/2000 | Kang .......................... | 370/320 |
| 6,535,499 B1 * | 3/2003 | Futamura et al. ............ | 370/342 |
| 6,567,653 B1 * | 5/2003 | Sanders ....................... | 370/335 |
| 6,728,326 B1 * | 4/2004 | Fulghum ...................... | 370/514 |
| 7,359,706 B2 * | 4/2008 | Zhao ............................ | 370/331 |
| 8,005,451 B2 * | 8/2011 | Kayano et al. ............... | 455/286 |
| 2004/0174834 A1 * | 9/2004 | Yoshida ................ | H04B 1/406 370/315 |
| 2005/0083890 A1 * | 4/2005 | Plotnik .................... | H04B 1/40 370/334 |
| 2006/0114855 A1 * | 6/2006 | Zheng ................... | H04W 28/24 370/331 |

(Continued)

FOREIGN PATENT DOCUMENTS

| | | |
|---|---|---|
| JP | 54-056341 A | 5/1979 |
| JP | 02-022931 A | 1/1990 |

(Continued)

OTHER PUBLICATIONS

Japanese Office Action mailed on Aug. 18, 2015 for Japanese Patent Application No. 2012-083172.

*Primary Examiner* — Jenee Williams
(74) *Attorney, Agent, or Firm* — Arent Fox LLP

(57) ABSTRACT

A wireless device includes an input/output port that receives a first transmission signal subjected to transmission processing by another wireless device, the first transmission signal being output from the another wireless device, the another wireless device using a second frequency band adjacent to a first frequency band used by the wireless device, a synthesis circuit that synthesizes the first transmission signal received via the port and a second transmission signal subjected to transmission processing by the wireless device and that outputs the synthesized signal via an antenna, and a splitting circuit that splitbranches a first reception signal of the first frequency band and a second reception signal of the second frequency band, the first and the second reception signals being included in a reception signal received via the antenna, the splitting circuit outputting a split reception signal of the second frequency band via the port to the other wireless device.

12 Claims, 7 Drawing Sheets

(56) References Cited

U.S. PATENT DOCUMENTS

| | | | |
|---|---|---|---|
| 2006/0252419 A1* | 11/2006 | Liu | 455/423 |
| 2007/0060075 A1* | 3/2007 | Mikuteit | 455/127.2 |
| 2008/0219292 A1* | 9/2008 | Wang | 370/484 |
| 2008/0253275 A1* | 10/2008 | Feher | 370/203 |
| 2009/0029710 A1* | 1/2009 | Ochiai | H04L 5/023 455/450 |
| 2009/0185522 A1* | 7/2009 | Periyalwar et al. | 370/328 |
| 2012/0091799 A1* | 4/2012 | Rofougaran et al. | 307/24 |
| 2012/0201258 A1* | 8/2012 | Bendixen et al. | 370/542 |
| 2013/0176913 A1* | 7/2013 | Niskanen et al. | 370/278 |

FOREIGN PATENT DOCUMENTS

| | | |
|---|---|---|
| JP | 11-177451 A | 7/1999 |
| JP | 2008-526155 A | 7/2008 |
| WO | WO 2006/071005 A1 | 7/2006 |

\* cited by examiner

WIRELESS DEVICE

CROSS-REFERENCE TO RELATED APPLICATION

This application is based upon and claims the benefit of priority of the prior Japanese Patent Application No. 2012-083172, filed on Mar. 30, 2012, the entire contents of which are incorporated herein by reference.

FIELD

The embodiments discussed herein are related to wireless devices.

BACKGROUND

In recent years, in wireless communication using wireless terminals such as cellular phones, radio devices have been used, which are wireless devices having for example a function of modulating and demodulating radio waves and transmitting and receiving radio waves from an antenna. For such radio devices, a technology is known in which an antenna is shared by different services employing the same frequency band and as a result the antenna cost is reduced. Examples of services that employ the same frequency band include a service that employs both code division multiple access (cdma) 2000 and long term evolution (LTE) and a service that employs just cdma 2000.

FIG. 5 illustrates an example of outgoing signals of radio devices of the background art. In addition, FIG. 6 illustrates an example of incoming signals of the radio devices of the background art. In FIGS. 5 and 6, an example is illustrated in which an antenna 672 is shared by a radio device 600 that provides a service employing both cdma 2000 and LTE and a radio device 700 that provides a service employing just cdma 2000. In FIGS. 5 and 6, to simplify illustration, illustration of the internal structures of the radio devices 600 and 700 has been appropriately omitted.

As illustrated in FIG. 5, a special filter 800 (for example, a constant impedance bandpass filter (CIB)) is used in order to allow the antenna 672 to be shared by the radio device 600 and the radio device 700. The special filter 800 includes hybrid circuits (HYBs) 810 and 816, band pass filters (BPFs) 812 and 814 and a cdma duplexer (DUP) (transmission/reception switcher) 818.

Next, the frequency division filter waveforms of the special filter 800 and a general filter will be described. FIG. 7 illustrates an example of the frequency division filter waveform of the special filter. FIG. 8 illustrates an example of the filter waveform of the general filter.

As illustrated in FIG. 7, an LTE band 320 and a cdma 2000 band 330 are used by a service employing both cdma 2000 and LTE. In addition, a cdma 2000 band 340 is used by a service employing just cdma 2000. As illustrated in FIG. 7, the LTE band 320, the cdma 2000 band 330 and the cdma 2000 band 340 lie within the same frequency band. Accordingly, the special filter 800 has a steep filtering characteristic as indicated by a filter waveform 350 so that the cdma 2000 band 340 may be discriminated from the other bands. By using the special filter 800, it is possible to allow only the cdma 2000 band 340 to pass through the filter. In contrast, as illustrated in FIG. 8, the general filter has a gently sloping filtering characteristic as indicated by a filter waveform 370 and a comparatively wide frequency band 360 is allowed to pass therethrough.

The description will now return to FIG. 5. As illustrated in FIG. 5, the radio device 600 has an ANT-A port 662, an LNA-A port 664, an ANT-B port 666 and an LNA-B port 668. The radio device 600 receives baseband signals from a cdma baseband unit (BBU) 850 and an LTE BBU 900 ((1) in the figure). The radio device 600 subjects the received baseband signals to transmission processing ((2) in the figure) and outputs the signals subjected to the transmission processing to the special filter 800 via the ANT-B port 666 ((3) in the figure). The signals input to the special filter 800 are completely reflected by the HYB 810 and are radiated from the antenna 672 ((4) in the figure).

On the other hand, the radio device 700 has an ANT-A port 762, an LNA-A port 764 and an ANT-B port 766. The radio device 700 receives a baseband signal from a cdma BBU 950 ((1)' in the figure). The radio device 700 subjects the received baseband signal to transmission processing ((2)' in the figure) and outputs the signal subjected to the transmission processing to the special filter 800 via the ANT-A port 762 ((3)' in the figure). The signal input to the special filter 800 passes through the special filter 800 and is radiated from the antenna 672 ((4)' in the figure).

Next, as illustrated in FIG. 6, a baseband signal received from the antenna 672 is input to the special filter 800 ((1) in the figure), is totally reflected by the HYB 810 and is output from the special filter 800 ((2) in the figure). The baseband signal totally reflected by the HYB 810 is input to the radio device 600 via the ANT-B port 666 and is subjected to digital processing inside the radio device 600 ((3) in the figure). Signals obtained by separating the input signal into cdma and LTE signals by the digital processing are respectively transmitted to the cdma BBU 850 and the LTE BBU 900 ((4) in the figure).

On the other hand, a baseband signal received from the antenna 672 is input to the special filter 800 ((1) in the figure), is totally reflected by the HYB 810 and is output from the special filter 800 ((2) in the figure). The baseband signal totally reflected by the HYB 810 is input to the radio device 600 via the ANT-B port 666 and is output from the radio device 600 to the special filter 800 via the LNA-B port 668 ((3)' in the figure). The baseband signal input to the special filter 800 is input to the ANT-A port 762 of the radio device 700 via the cdma DUP 818 ((4)' in the figure). The radio device 700 subjects the input baseband signal to digital processing ((5)' in the figure) and then transmits the signal to the cdma BBU 950 ((6)' in the figure).

Thus, in the background art, the radio device 600 and the radio device 700 may share the antenna 672 by using the special filter 800 having a steep filtering characteristic.

An example of the background art is Japanese Laid-open Patent Publication No. 2-022931.

SUMMARY

According to an aspect of the invention, a wireless device includes an input/output port that receives a first transmission signal subjected to transmission processing by another wireless device, the first transmission signal being output from the another wireless device, the another wireless device using a second frequency band adjacent to a first frequency band used by the wireless device, a synthesis circuit that synthesizes the first transmission signal received via the input/output port and a second transmission signal subjected to transmission processing by the wireless device and that outputs the synthesized signal via an antenna, and a splitting circuit that splits a first reception signal of the first frequency band from a reception signal and a second reception signal of the second frequency band from the reception signal, the first reception signal and the second reception signal being included in the reception signal received via the antenna, the splitting circuit outputting a split reception signal of the second frequency band via the input/output port to the other wireless device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Since the special filter described above has a steep filtering characteristic, it is more expensive than a general filter having a gently sloping filtering characteristic. In addition, in the background art, since an antenna is shared by a plurality of radio devices by using a special filter, issues remains regarding the complexity of the overall structure and the serviceability.

Hereafter, an embodiment of wireless devices disclosed in this application will be described in detail on the basis of the drawings. However, the disclosed technology is not limited by this embodiment. For example, in the below described embodiment, radio devices are described as an example of wireless devices, but the disclosed technology is not limited to radio devices.

Figure 1:
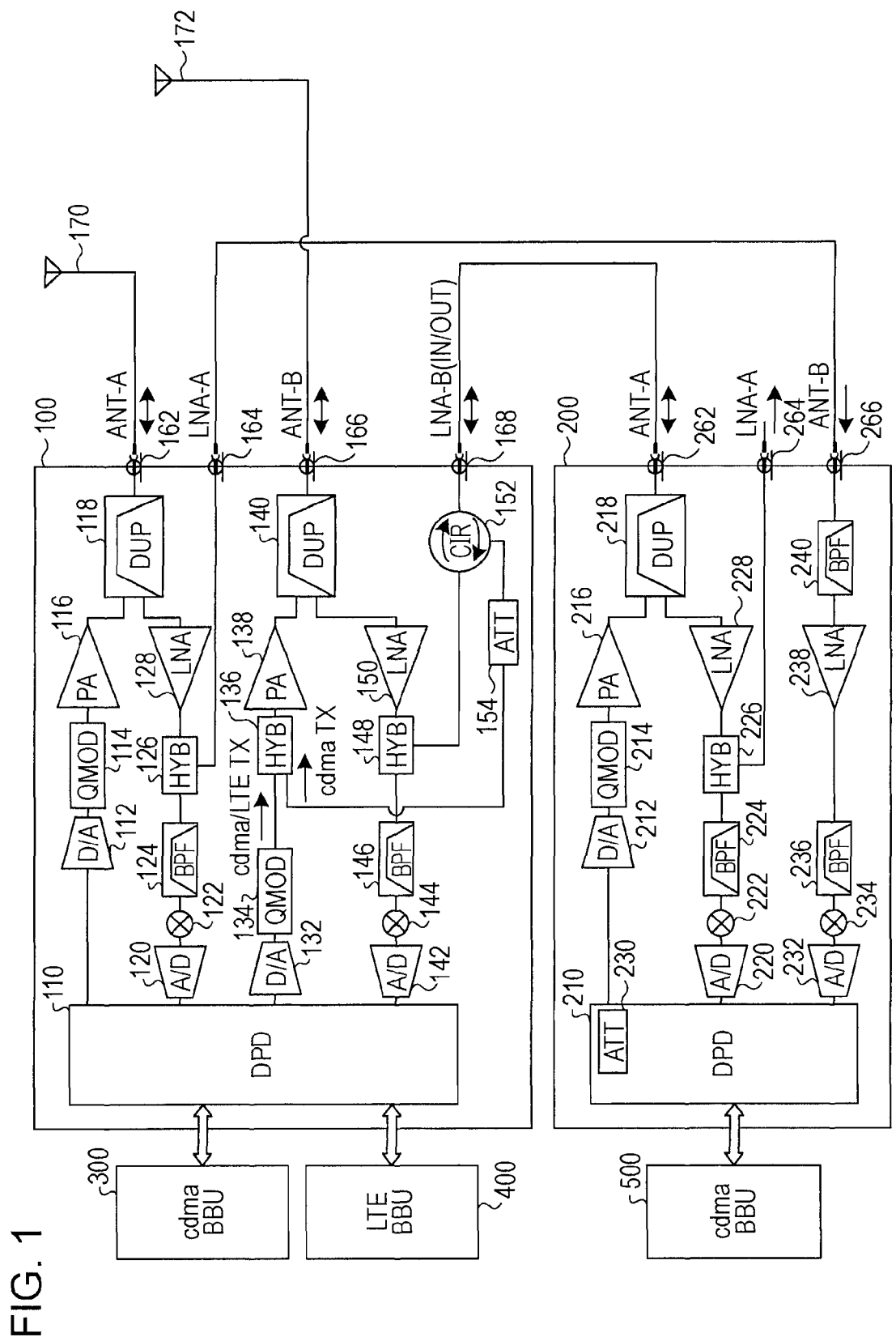
FIG. 1 illustrates the structures of radio devices of this embodiment.
Figure 2:
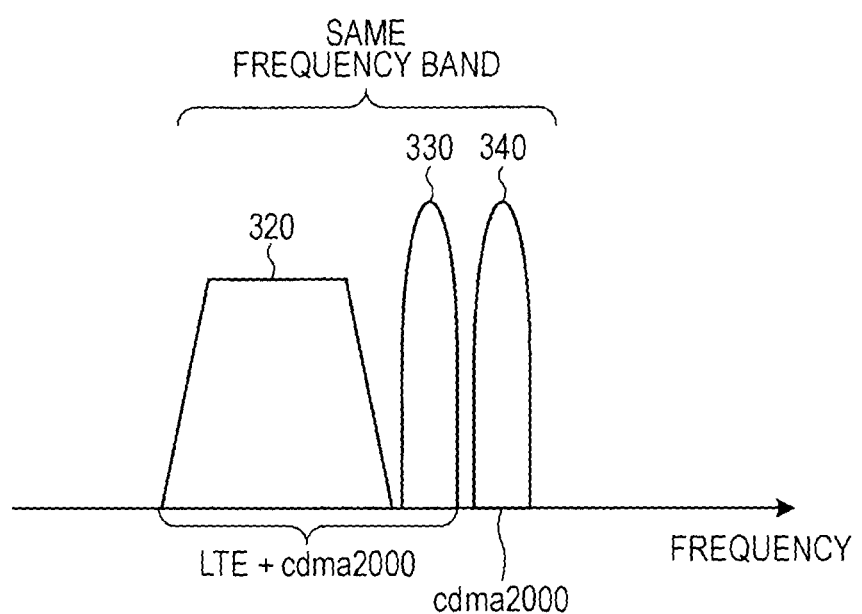
FIG. 2 illustrates an example arrangement of frequencies shared by systems in the same frequency band.

FIG. 1 illustrates the structures of radio devices of this embodiment. FIG. 2 illustrates an example arrangement of frequencies shared by systems in the same frequency band. As illustrated in FIG. 1, in this embodiment, an antenna 172 is shared by a radio device 100 that provides a service employing both cdma 2000 and LTE and a radio device 200 that provides a service employing just cdma 2000. In addition, in this embodiment, as illustrated in FIG. 1, the antenna 172 is shared by the radio device 100 and the radio device 200 without the use of a special filter, which is used in the background art.

In addition, as illustrated in FIG. 2, an LTE band 320, a cdma band 330 and a cdma band 340 are arranged adjacent to one another and lie within the same frequency band. The LTE band 320 and the cdma band 330 are frequency bands in which services are provided by the radio device 100. In addition, the cdma band 340 is a frequency band in which a service is provided by the radio device 200.

The description will now return to FIG. 1. As illustrated in FIG. 1, the radio device 100 includes a digital predistortion unit (DPD) 110, a digital-to-analog converter (D/A) 112, a quadrature modulator (QMOD) 114 and a power amplifier (PA) 116. In addition, the radio device 100 includes a duplexer (DUP) 118, an analog-to-digital converter (A/D) 120, a mixer 122, a bandpass filter (BPF) 124, a hybrid circuit (HYB) 126 and a low-noise amplifier (LNA) 128.

In addition, the radio device 100 includes a D/A 132, a QMOD 134, a HYB 136, a PA 138, a DUP 140, an A/D 142, a mixer 144, a BPF 146, a HYB 148, an LNA 150, a circulator (CIR) 152 and an attenuator (ATT) 154.

In addition, the radio device 100 has an ANT-A port 162, an LNA-A port 164, an ANT-B port 166 and an LNA-B port 168. The ANT-A port 162, the ANT-B port 166 and the LNA-B port 168 are input/output ports and the LNA-A port 164 is an output port. Thus, in the radio device 100, the LNA-B port, which was an output port in the background art, serves as an input/output port.

The DPD 110 compensates nonlinear distortion of signals transmitted and received to and from a cdma baseband unit (BBU) (cdma wireless basestation) 300 and an LTE BBU 400. The D/A 112 converts a digital signal output from the DPD 110 into an analog signal. The QMOD 114 performs an orthogonal transformation on an analog signal obtained by the conversion performed by the D/A 112. The PA 116 amplifies a signal subjected to the orthogonal transformation by the QMOD 114. The DUP 118 outputs a signal amplified by the PA 116 from an antenna 170 via the ANT-A port 162 and outputs a signal input from the antenna 170 via the ANT-A port 162 to the LNA 128.

The LNA 128 amplifies a signal output from the DUP 118. The BPF 124 is a filter that only allows the LTE band 320 and the cdma band 330 included in a signal output from the LNA 128 to pass therethrough. The HYB 126 outputs signals of the LTE band 320 and the cdma band 330 included in a signal output from the LNA 128 to the mixer 122 via the BPF 124. In addition, the HYB 126 outputs a signal of the cdma band 340 included in a signal output from the LNA 128 to the radio device 200 via the LNA-A port 164. The mixer 122 performs frequency conversion on a signal output from the BPF 124. The A/D 120 converts an analog signal output from the mixer 122 into a digital signal and outputs the digital signal to the DPD 110.

The D/A 132 converts a digital signal output from the DPD 110 into an analog signal. The QMOD 134 performs an orthogonal transformation on an analog signal obtained by the conversion performed by the D/A 132. The HYB 136 is a synthesis circuit that synthesizes a signal output from the QMOD 134 and a signal output from the radio device 200 and input via the CIR 152 and the ATT 154 and outputs the synthesized signal to the PA 138. The PA 138 amplifies a signal including an output signal of the radio device 100 and an output signal of the radio device 200 output from the HYB 136. The DUP 140 outputs a signal amplified by the PA 138 from the antenna 172 via the ANT-B port 166 and outputs a signal input from the antenna 172 via the ANT-B port 166 to the LNA 150.

The LNA 150 amplifies a signal output from the DUP 140. The BPF 146 is a filter that only allows the LTE band 320 and the cdma band 330 included in a signal output from the LNA 150 to pass therethrough. The HYB 148 outputs signals of the LTE band 320 and the cdma band 330 included in a signal output from the LNA 150 to the mixer 144 via the BPF 146. In addition, the HYB 148 outputs a signal of the cdma band 340 included in a signal output from the LNA 150 to the CIR 152. The mixer 144 performs frequency conversion on a signal output from the BPF 146. The A/D 142 converts an analog signal output from the mixer 144 into a digital signal.

The CIR 152 outputs a signal output from the HYB 148 to the radio device 200 via the LNA-B port 168 and outputs a signal input from the radio device 200 via the LNA-B port 168 to the ATT 154. The ATT 154 attenuates a signal output from the CIR 152 and outputs the attenuated signal to the HYB 136. That is, the HYB 148 is a branching circuit (or splitting circuit) that branches signals of the LTE band 320 and the cdma band 330 included in a signal output from the LNA 150 and a signal of the cdma band 340 included in a signal output from the LNA 150 and outputs the branched signal of the cdma band 340 to the radio device 200 via the LNA-B port 168.

Next, the radio device 200 will be described. The radio device 200 includes a DPD 210, a D/A 212, a QMOD 214, a PA 216, a DUP 218, an A/D 220, a mixer 222, a BPF 224, a HYB 226 and an LNA 228. In addition, the radio device 200 includes an A/D 232, a mixer 234, a BPF 236, an LNA 238 and a BPF 240.

In addition, the radio device 200 has an ANT-A port 262, an LNA-A port 264 and an ANT-B port 266. The ANT-A port 262 is an input/output port, the LNA-A port 264 is an output port and the ANT-B port 266 is an input port. Thus, the radio device 200 has a one transmission antenna and two reception antenna (1T/2R) configuration.

The DPD 210 compensates non-linear distortion of signals transmitted to and received from a cdma BBU 500. The DPD 210 includes an ATT 230. The ATT 230 attenuates a signal output from the DPD 210. The D/A 212 converts a digital signal output from the DPD 210 into an analog signal. The QMOD 214 performs an orthogonal transformation on an analog signal obtained by the conversion performed by the D/A 212. The PA 216 amplifies a signal subjected to the orthogonal transformation by the QMOD 214. The DUP 218 outputs a signal amplified by the PA 216 to the radio device 100 via the ANT-A port 262 and outputs a signal input from the radio device 100 via the ANT-A port 262 to the LNA 228.

The LNA 228 amplifies a signal output from the DUP 218. The BPF 224 is a filter that allows only the cdma band 330 included in a signal output from the LNA 228 to pass therethrough. The HYB 226 outputs a signal of the cdma band 330 included in a signal output from the LNA 228 to the mixer 222 via the BPF 224. In addition, the HYB 226 outputs via the LNA-A port 264 signals of the LTE band 320 and the cdma band 330 included in a signal output from the LNA 228. The mixer 222 performs frequency conversion on a signal output from the BPF 224. The A/D 220 converts an analog signal output from the mixer 222 into a digital signal and outputs the digital signal to the DPD 210.

The BPF 240 receives a signal output from the radio device 100 via the ANT-B port 266. The BPF 236 and the BPF 240 are filters that only allow the cdma band 330 included in a signal output from the radio device 100 to pass therethrough. The LNA 238 amplifies a signal output from the BPF 240 and outputs the amplified signal to the mixer 234 via the BPF 236. The mixer 234 performs frequency conversion on a signal output from the BPF 236. The A/D 232 converts an analog signal output from the mixer 234 into a digital signal and outputs the digital signal to the DPD 210.

Figure 3:
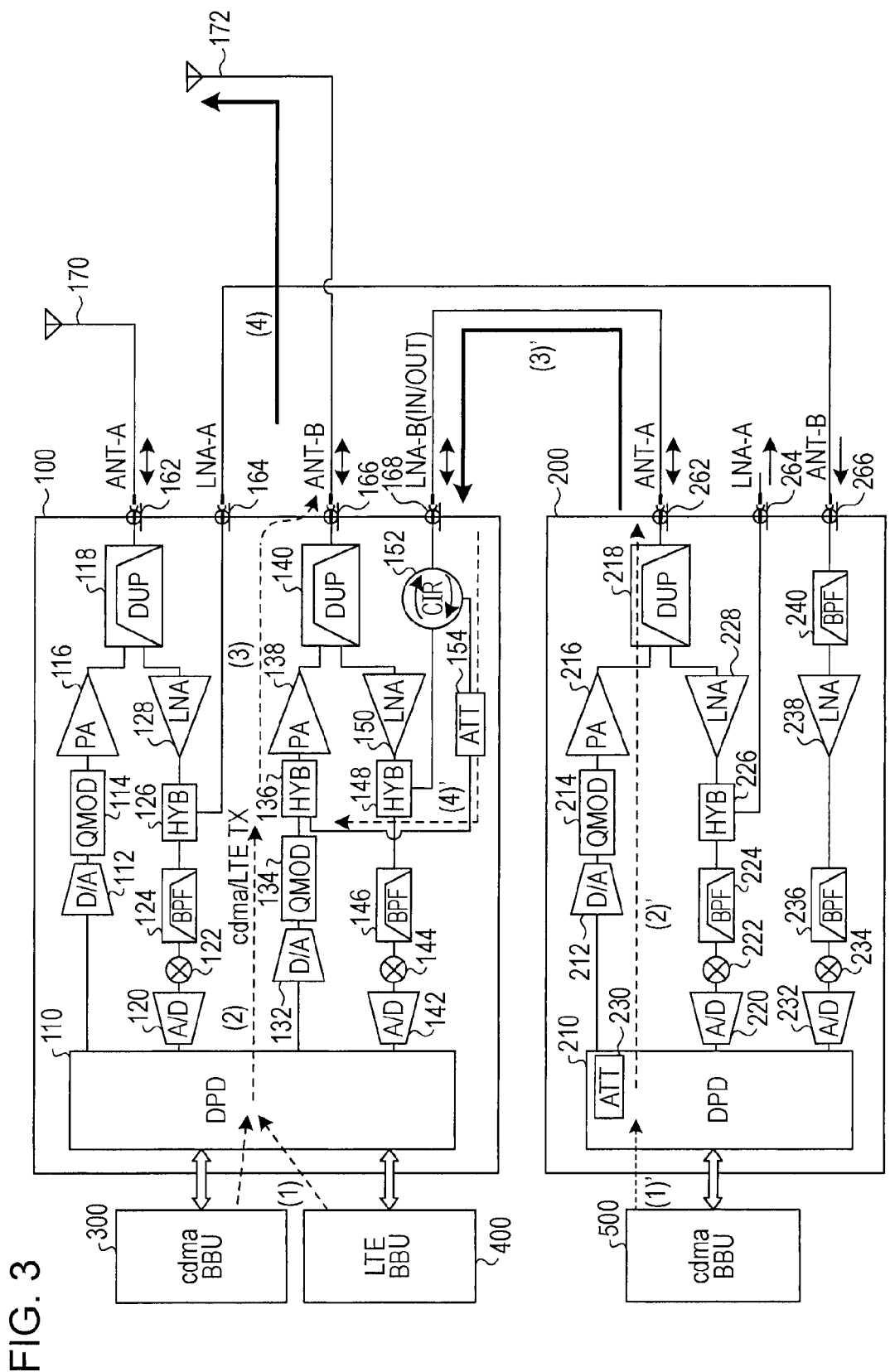
FIG. 3 illustrates an example of outgoing signals of radio devices of this embodiment.

Next, an example of outgoing signals of the radio devices 100 and 200 will be described. Here, the processing of the radio devices 100 and 200, which share the antenna 172 to transmit outgoing signals, will be described. FIG. 3 illustrates an example of outgoing signals of the radio devices of this embodiment. As illustrated in FIG. 3, first, the radio device 100 receives baseband signals from the cdma BBU 300 and the LTE BBU 400 ((1) in the figure). The radio device 100 subjects the received baseband signals to transmission processing such as compensation of non-linear distortion, digital-to-analog conversion and orthogonal transformation using the DPD 110, the D/A 132 and the QMOD 134, and outputs the signals to the HYB 136 ((2) in the figure).

On the other hand, the radio device 200 receives a baseband signal from the cdma BBU 500 ((1)' in the figure). The radio device 200 subjects the received baseband signal to transmission processing such as non-linear distortion compensation, attenuation, digital-to-analog conversion, orthogonal transformation and amplification using the DPD 210, the ATT 230, the D/A 212, the QMOD 214, the PA 216 and the DUP 218 ((2)' in the figure). The radio device 200 outputs the signal that has been subjected to the transmission processing from the ANT-A port 262 to the CIR 152 via the LNA-B port 168 of the radio device 100 ((3)' in figure).

The CIR 152 outputs the signal input via the LNA-B port 168 to the ATT 154 and the ATT 154 attenuates the signal output from the CIR 152 and outputs the attenuated signal to the HYB 136 ((4)' in figure).

The HYB 136 synthesizes a signal including the LTE band 320 and the cdma band 330 output from the QMOD 134 and a signal including the cdma band 340 output from the ATT 154 and outputs the synthesized signal via the PA 138, the DUP 140 and the ANT-B port 166 ((3) in figure). The signal output from the ANT-B port 166 is radiated via the antenna 172 ((4) in the figure).

Figure 4:
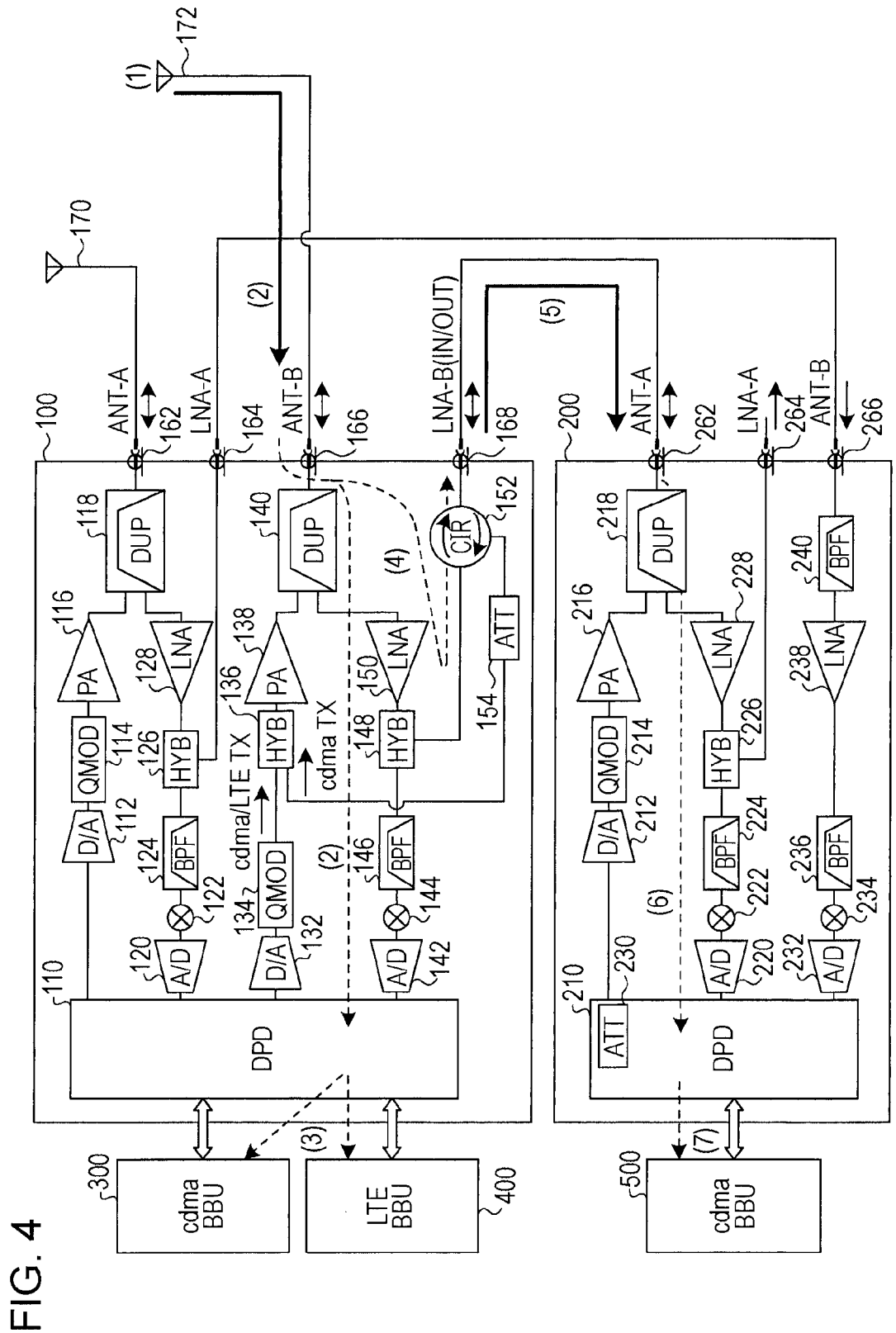
FIG. 4 illustrates an example of incoming signals of radio devices of this embodiment.
Figure 5:
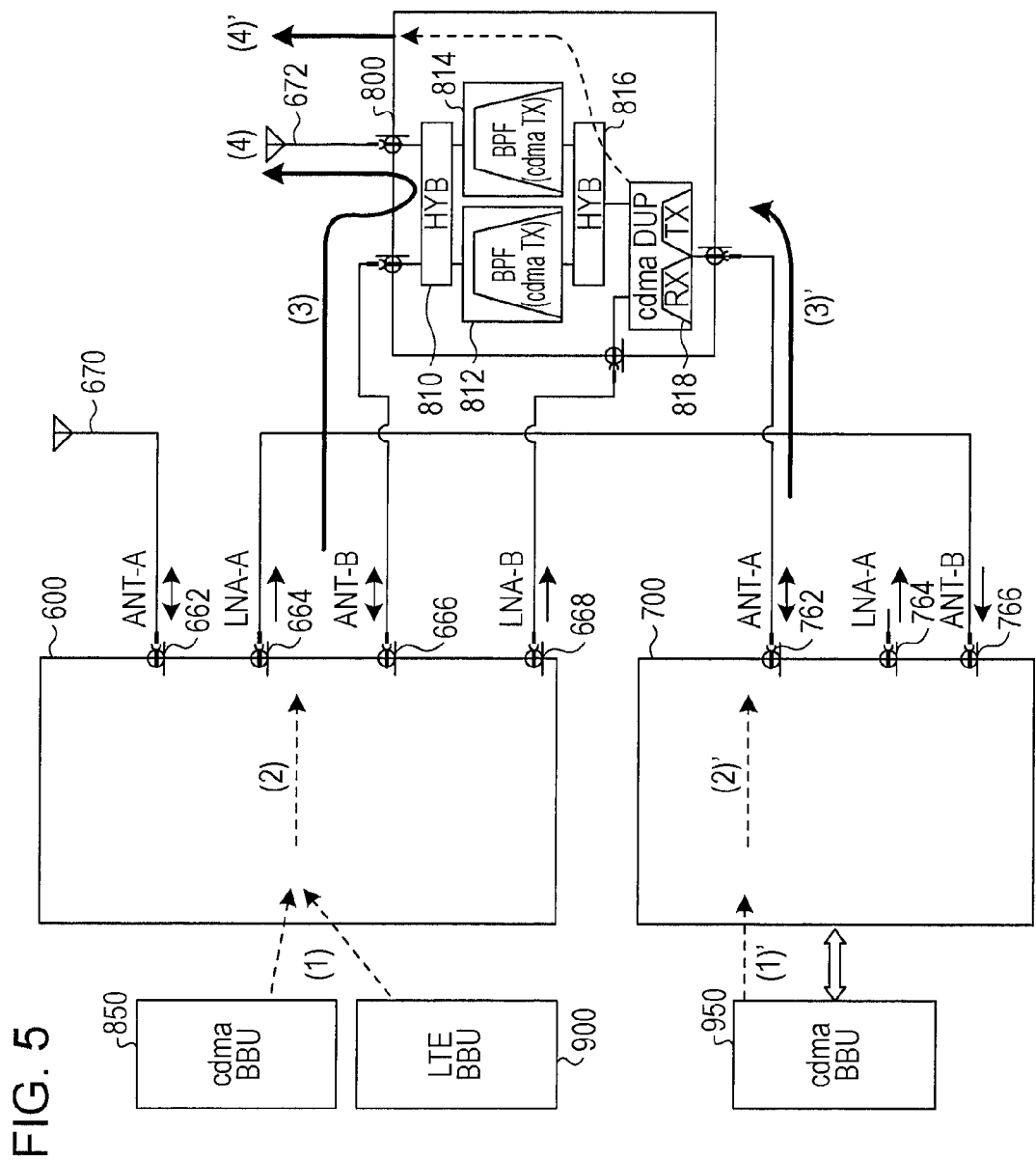
FIG. 5 illustrates an example of outgoing signals of radio devices of the background art.
Figure 6:
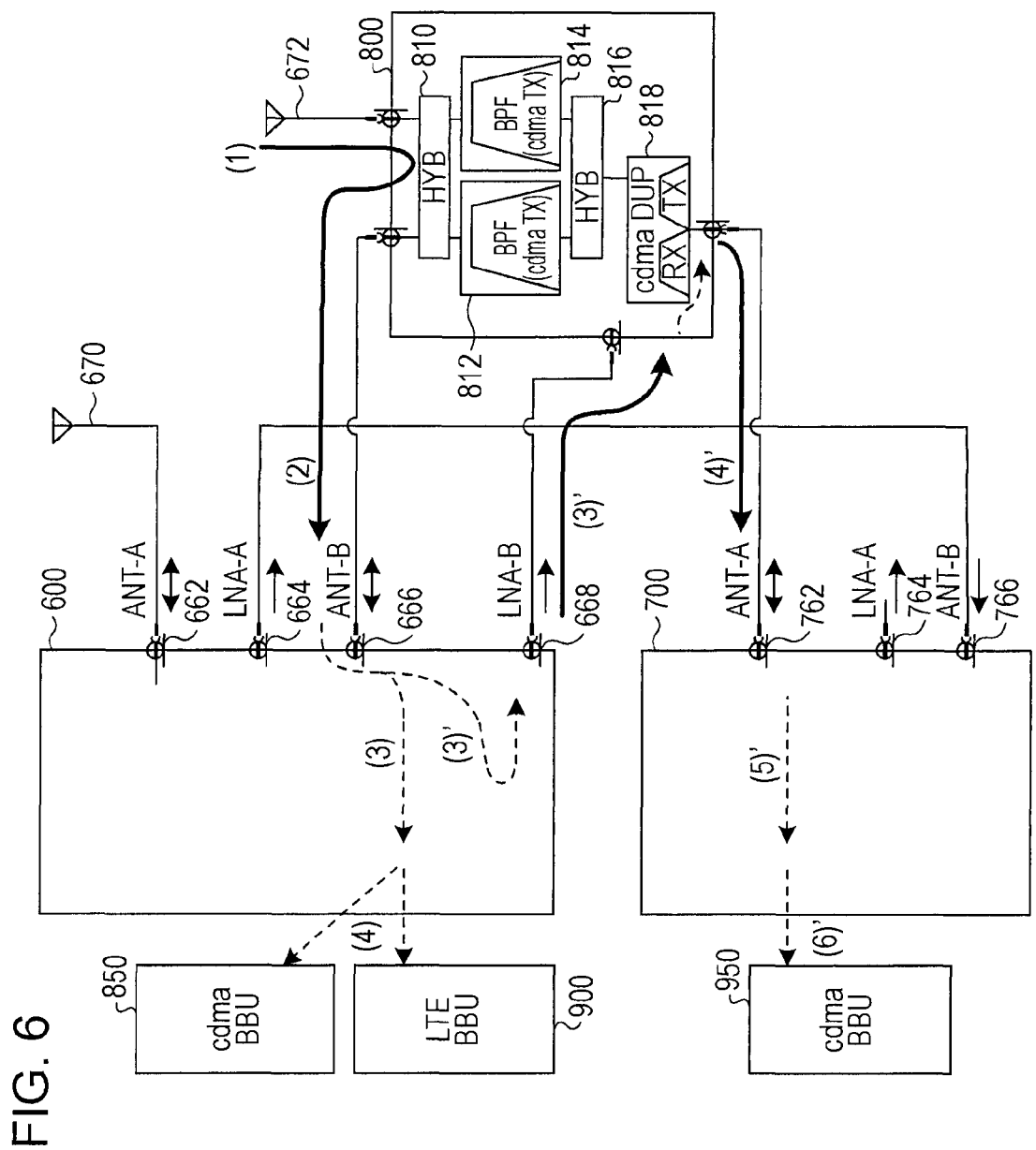
FIG. 6 illustrates an example of incoming signals of radio devices of the background art.
Figure 7:
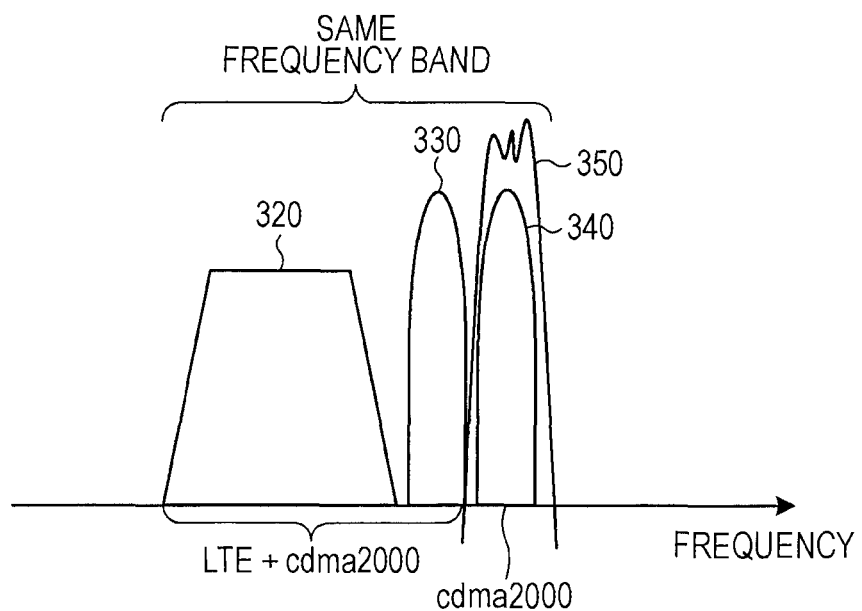
FIG. 7 illustrates an example of the frequency division filter waveform of a special filter.
Figure 8:
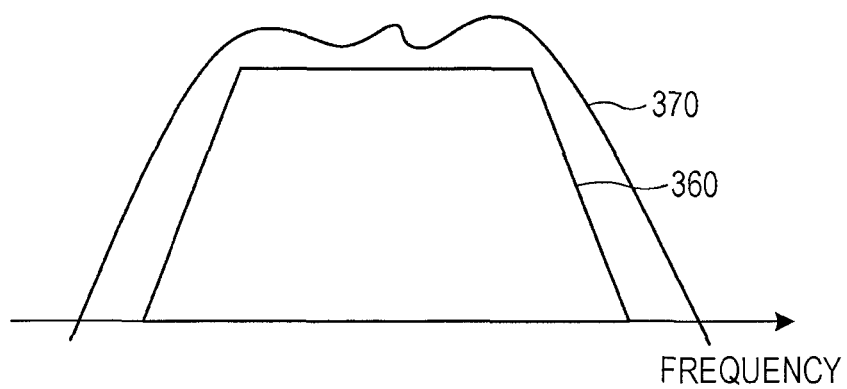
FIG. 8 illustrates an example of the filter waveform of a general filter.

Next, an example of incoming signals of the radio devices 100 and 200 will be described. Here, the processing of the radio devices 100 and 200, which share the antenna 172 to receive incoming signals, will be described. FIG. 4 illustrates an example of incoming signals of the radio devices of this embodiment. First, a signal received via the antenna 172 is input to the radio device 100 via the ANT-B port 166 ((1) in the figure).

The radio device 100 performs reception processing on an input signal including the LTE band 320 and the cdma band 330 using the DUP 140, the LNA 150, the HYB 148, the BPF 146, the mixer 144, the A/D 142 and the DPD 110 ((2) in the figure). That is, the radio device 100 amplifies the received signal using the LNA 150 and outputs to the mixer 144 a signal including the LTE band 320 and the cdma band 330 using the HYB 148 and the BPF 146. In addition, on a signal output from the BPF 146, the radio device 100 performs frequency conversion using the mixer 144 and analog-to-digital conversion using the A/D 142. Then, from a signal output from the A/D 142, using the DPD 110, the radio device 100 outputs a signal including the cdma band 330 to the cdma BBU 300 and outputs a signal including the LTE band 320 to the LTE BBU 400 ((3) in the figure).

On the other hand, the radio device 100 branches a signal including the cdma band 340 included in a signal input via the ANT-B port 166 from the HYB 148 and outputs the signal to the LNA-B port 168 via the CIR 152 ((4) in the figure). The signal output from the LNA-B port 168 is input to the ANT-A port 262 of the radio device 200 ((5) in the figure).

The radio device 200 performs reception processing on the input signal using the DUP 218, the LNA 228, the HYB 226, the BPF 224, the mixer 222, the A/D 220 and the DPD 210 ((6) in the figure). That is, the radio device 200 amplifies the received signal using the LNA 228 and outputs to the mixer 222 a signal including the cdma band 340 using the HYB 226 and the BPF 224. In addition, on the signal output from the BPF 224, the radio device 200 performs frequency conversion using the mixer 222 and analog-to-digital conversion using the A/D 220. Then, the radio device 200 outputs the signal output from the A/D 220 to the cdma BBU 500 using the DPD 210 ((7) in the figure).

According to this embodiment, radio devices that have a simple structure and have excellent serviceability may be realized. In other words, in the background art, a special filter having a steep filtering characteristic has been used in the case where an antenna is shared by a plurality of radio devices providing services using adjacent frequency bands (within the same frequency band). However, since such a special filter has a steep filtering characteristic, there are issues in that the cost is increased (for example, increased by several tens of thousands of yen), there is an extra installation area for the special filter of 8 to 10 liters and in terms of maintenance in that the connection of cables becomes more complex.

In contrast, the radio device 100 of this embodiment includes the LNA-B port 168 that receives a transmission signal subjected to transmission processing by the radio device 200, which uses an adjacent frequency band, and output from the radio device 200. In addition, the radio device 100 includes the HYB 136 that synthesizes the transmission signal received via the LNA-B port 168 and a transmission signal subjected to transmission processing by the radio device 100 and outputs the synthesized signal via the antenna 172. In addition, the radio device 100 includes the HYB 148 that branches a reception signal of an adjacent frequency band included in a reception signal received via the antenna 172 and outputs the branched reception signal of adjacent frequency band to the radio device 200 via the LNA-B port 168. Therefore, according to this embodiment, the antenna 172 may be shared by the radio device 100 and the radio device 200 without use of a special filter, which is used in the background art. As a result, according to this embodiment, since a special filter is not used, radio devices may be realized with which an increase in cost may be suppressed, with which the installation area and the number of connection cables may be decreased, that has a simple structure, and that has excellent serviceability.

In addition, the radio device 100 of this embodiment includes the CIR 152 that outputs a transmission signal received via the LNA-B port 168 to the HYB 136 and that outputs a reception signal output from the HYB 148 to the radio device 200 via the LNA-B port 168. Therefore, according to this embodiment, via the LNA-B port 168, a transmission signal output from the radio device 200 may be output to the HYB 136 and a reception signal output from the HYB 148 may be output to the radio device 200.

In addition, the radio device 100 of this embodiment includes the ATT 154 that attenuates a transmission signal output from the CIR 152 and outputs the attenuated signal to the HYB 136. Therefore, according to this embodiment, as well as a transmission signal transmitted from the radio device 200 being attenuated using the ATT 230 included in the radio device 200, a transmission signal may also be attenuated using the ATT 154, and therefore the saturation or degradation of a transmission signal may be suppressed.

Thus, compact and low cost circuits such as the ATT 154, the CIR 152 and the HYB 136 are added inside the radio device 100 and the LNA-B port (output only) of the background art is replaced with the bidirectional LNA-B port 168 (RF input/output port). In addition, the transmission power input to the LNA-B port 168 is also attenuated using the ATT 230 mounted in the radio device 200. Thus, the antenna 172 may be shared by the radio device 100 and the radio device 200 without the use of a special filter, which is used in the background art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless device comprising:
    an input and output port configured to receive a second transmission signal which is subject to transmission processing by a second wireless device, the second wireless device being coupled to the wireless device via the input and output port and configured to use a second frequency band adjacent a first frequency band used by the wireless device, the second transmission signal being used for a second wireless communication based on a second wireless communication standard;
    a synthesis circuit configured to synthesize the second transmission signal received via the input and output port from the second wireless device and a first transmission signal which is subject to transmission processing by the wireless device; into a synthesized signal for transmission via an antenna associated with the wireless device, the first transmission signal being used for a first wireless communication based on a first wireless communication standard;
    a splitting circuit configured to obtain a first reception signal of the first frequency band from a reception signal received via the antenna and a second reception signal of the second frequency band from the reception signal, the first reception signal and the second reception signal being included in the reception signal received via the antenna, the splitting circuit being configured to output the second reception signal of the second frequency band via the input and output port to the second wireless device.

2. The wireless device according to claim 1, further comprising a circulator circuit configured to:
    send the second transmission signal received via the input/output port to the synthesis circuit, and
    send the second reception signal of the second frequency band output from the splitting circuit, via the input and output port, to the second wireless device.

3. The wireless device according to claim 2, further comprising an attenuation circuit configured to:
    receive the second transmission signal from the circulator circuit,
    attenuate the second transmission signal from the circulator circuit, and
    output the attenuated second transmission signal to the synthesis circuit.

4. The wireless device according to claim 1, wherein the first wireless communication standard is different from the second wireless communication standard.

5. The wireless device according to claim 4, wherein the first frequency band is configured to support the first wireless communication standard and the second wireless communication standard, and the second frequency band is configured to support the first wireless communication standard.

6. The wireless device according to claim 5, wherein the first wireless communication standard is Long Term Evolution (LTE), and the second wireless communication standard is Code Division Multiple Access (CDMA).

7. The wireless device according to claim 1, wherein:
the wireless device comprises a first radio equipment and the second wireless device comprises a second radio equipment;
the first radio equipment is configured to transfer the synthesized signal via the antenna to a terminal device; and
the first radio equipment is configured to receive the reception signal via the antenna from the terminal device.

8. The wireless device according to claim 7, wherein the first radio equipment is further configured to transfer the first reception signal to a base band device.

9. A method for wireless communications, comprising:
receiving, via an input and output port of a first apparatus, a second transmission signal from a second apparatus which is configured to use a second frequency band adjacent a first frequency band of the first apparatus, the second apparatus being coupled to the first apparatus via the input and output port of the first apparatus,
sending, via a circulator of the first apparatus, the second transmission signal to a synthesis circuit of the first apparatus,
combining, at the synthesis circuit of the first apparatus, the second transmission signal received via the input and output port of the first apparatus and a first transmission signal of the first apparatus to result in a synthesized signal; and
outputting the synthesized signal to an antenna for transmission.

10. The method for wireless communications according to claim 9, further comprising:
obtaining a first reception signal of the first frequency band from a reception signal received via the antenna;
obtaining a second reception signal of the second frequency band from the reception signal received via the antenna; and
outputting the second reception signal of the second frequency band, via the input and output port of the first apparatus, to the second apparatus.

11. The method for wireless communications according to claim 9, further comprising:
before combining the second transmission signal and the first transmission signal, attenuating the second transmission signal from the second apparatus.

12. A wireless device comprising:
an input and output port configured to receive a second transmission signal which is subject to transmission processing by a second wireless device, the second wireless device being coupled to the wireless device via the input and output port and configured to use a second frequency band adjacent a first frequency band used by the wireless device;
a synthesis circuit configured to synthesize the second transmission signal received via the input and output port from the second wireless device and a first transmission signal which is subject to transmission processing by the wireless device into a synthesized signal for transmission via an antenna associated with the wireless device to a remote wireless terminal on a wireless network;
a splitting circuit configured to obtain a first reception signal of the first frequency band from a reception signal received via the antenna and a second reception signal of the second frequency band from the reception signal, the first reception signal and the second reception signal being included in the reception signal received via the antenna, the splitting circuit being configured to output the second reception signal of the second frequency band via the input and output port to the second wireless device.

* * * * *